United States Patent
Weinberg

(10) Patent No.: US 11,531,095 B2
(45) Date of Patent: Dec. 20, 2022

(54) SYSTEM AND METHOD FOR IMPROVED RESOLUTION IN A LIDAR SYSTEM

(71) Applicant: Analog Devices, Inc., Norwood, MA (US)

(72) Inventor: Harvey Weinberg, Sharon, MA (US)

(73) Assignee: Analog Devices, Inc., Norwood, MA (US)

( * ) Notice: Subject to any disclaimer, the term of this patent is extended or adjusted under 35 U.S.C. 154(b) by 888 days.

(21) Appl. No.: 16/374,546

(22) Filed: Apr. 3, 2019

(65) Prior Publication Data
US 2020/0319318 A1 Oct. 8, 2020

(51) Int. Cl.
*G01S 7/4865* (2020.01)

(52) U.S. Cl.
CPC .................. *G01S 7/4866* (2013.01)

(58) Field of Classification Search
CPC ........ G01S 7/4866; G01S 7/48; G01S 7/4865; G01S 7/4861; G01S 7/486; G01S 7/483; G01S 17/88; G01S 17/89; G01S 17/894
See application file for complete search history.

(56) References Cited

U.S. PATENT DOCUMENTS

| | | | |
|---|---|---|---|
| 6,120,461 A | 9/2000 | Smyth | |
| 6,137,566 A | 10/2000 | Leonard et al. | |
| 6,414,746 B1 | 7/2002 | Stettner et al. | |
| 6,535,275 B2 | 3/2003 | McCaffrey et al. | |
| 8,294,809 B2 | 10/2012 | Stettner | |
| 9,086,275 B2 | 7/2015 | Weinberg et al. | |
| 9,810,786 B1 | 11/2017 | Welford et al. | |
| 9,933,513 B2 | 4/2018 | Dussan et al. | |
| 10,094,925 B1 | 10/2018 | Lachapelle | |
| 2004/0119838 A1 | 6/2004 | Griffis et al. | |
| 2009/0059201 A1 | 3/2009 | Willner et al. | |
| 2015/0301180 A1 | 10/2015 | Stettner et al. | |
| 2016/0003946 A1 | 1/2016 | Gilliland et al. | |
| 2017/0350983 A1 | 12/2017 | Hall et al. | |
| 2018/0299535 A1 | 10/2018 | Jew et al. | |
| 2018/0306926 A1* | 10/2018 | LaChapelle | G01J 1/44 |
| 2018/0372873 A1 | 12/2018 | Koifman et al. | |

* cited by examiner

*Primary Examiner* — Luke D Ratcliffe
(74) *Attorney, Agent, or Firm* — Schwegman Lundberg & Woessner, P.A.

(57) ABSTRACT

Techniques are described to for improving a resolution of a light detection and ranging (LIDAR) system. A receiver circuit of a LIDAR system can sample a reflection signal from an object in response to a transmitted light pulse. A controller can determine a curve fit to the received samples and, based on a peak value of the curve fit, determine a precise location of the object.

20 Claims, 7 Drawing Sheets

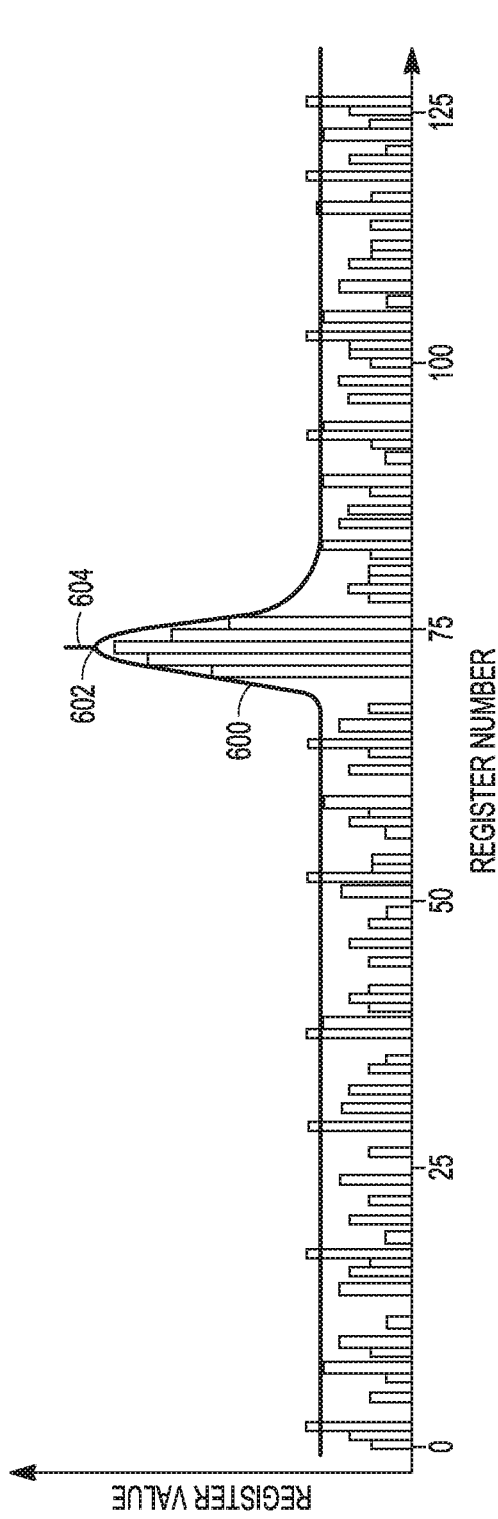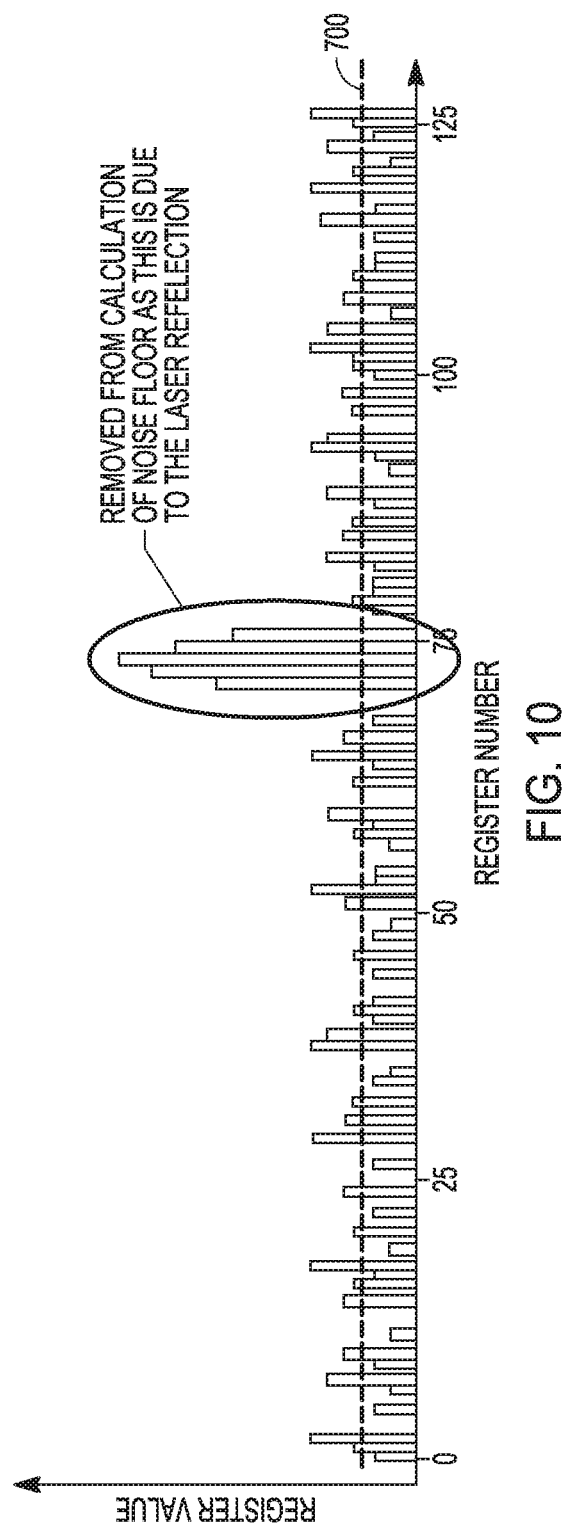

SYSTEM AND METHOD FOR IMPROVED RESOLUTION IN A LIDAR SYSTEM

FIELD OF THE DISCLOSURE

This document pertains generally, but not by way of limitation, to systems for providing light detection and ranging (LIDAR).

BACKGROUND

Light detection and ranging (LIDAR) systems, such as automotive LIDAR systems, can operate by transmitting one or more pulses of light towards a target region. The one or more transmitted light pulses can illuminate a portion of the target region. A portion of the one or more transmitted light pulses can be reflected and/or scattered by an object in the illuminated portion of the target region and received by the LIDAR system. The LIDAR system can then measure a time difference between the transmitted and received light pulses, such as to determine a distance between the LIDAR system and the illuminated object. The distance can be determined according to the expression $$d = \frac{tc}{2},$$

where d can represent a distance from the LIDAR system to the illuminated object, t can represent a round trip travel time, and c can represent a speed of light.

SUMMARY OF THE DISCLOSURE

This disclosure is directed to, among other things, techniques for improving a resolution of a light detection and ranging (LIDAR) system. Using various techniques of this disclosure, a receiver circuit of a LIDAR system can sample a reflection signal from an object in response to a transmitted light pulse. A controller can determine a curve fit to the received samples and, based on a peak value of the curve fit, determine a precise location of the object.

In addition, this disclosure describes various techniques to adjust a reference value used to determine whether a reflection signal has been received. Using various techniques, the reference value can be adjusted to improve the calculation of the noise floor.

In some aspects, this disclosure is directed to a LIDAR system for determining a location of an object by sampling a plurality of light pulses impinging on a receiver circuit having a photodiode coupled to an amplifier. The system comprises a controller coupled to an output of the amplifier and configured to, in response to a transmitted laser pulse: receive representations of the plurality of light pulses impinging on the photodiode; determine a curve fit to the received representations of the plurality of light pulses; and determine the location of the object based on a peak value of the curve fit.

In some aspects, this disclosure is directed to a method of determining a location of an object by sampling a plurality of light pulses impinging on a receiver circuit of a LIDAR system. The method comprises in response to a transmitted laser pulse: receiving representations of the plurality of light pulses; determining a curve fit to the received representations of the plurality of light pulses; and determining the location of the object based on a peak value of the curve fit.

In some aspects, this disclosure is directed to a LIDAR system for determining a location of an object by sampling a plurality of light pulses. The system comprising means for generating representations of the plurality of light pulses; in response to a transmitted laser pulse: means for determining a curve fit to the generated representations of the plurality of light pulses; and means for determining the location of the object based on a peak value of the curve fit.

This overview is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals can describe similar components in different views. Like numerals having different letter suffixes can represent different instances of similar components. The drawings illustrate generally, by way of example, but not by way of limitation, various embodiments discussed in the present document.

FIG. 9 is a graph of another example of a curve fit to a plurality of received samples.

FIG. 10 is a graph depicting a calculation of a reference value of a plurality of received samples.

DETAILED DESCRIPTION

This disclosure describes techniques to improve a resolution of a light detection and ranging (LIDAR) system. Using various techniques of this disclosure, a receiver circuit of a LIDAR system can sample a reflection signal from an object in response to a transmitted light pulse. A controller can determine a curve fit to the received samples and, based on a peak value of the curve fit, determine a precise location of the object.

In addition, this disclosure describes various techniques to adjust a reference value used to determine whether a reflection signal has been received. Using various techniques, the reference value can be adjusted to improve the calculation of the noise floor. Using the techniques of this disclosure, the resolution of the LIDAR can be improved.

Figure 1:
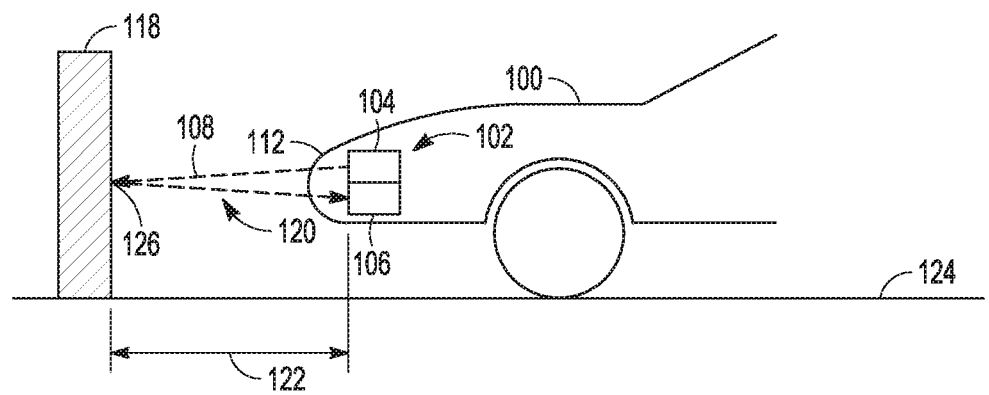
FIG. 1 schematically illustrates an embodiment of a laser detection and ranging system in an automobile.

The LIDAR techniques of this disclosure can be useful for a wide variety of applications, including but not limited to processing reflected signals in automotive proximity sensing circuits, as schematically illustrated in FIG. 1, for example.

FIG. 1 is a schematic diagram of an automobile in combination with a LIDAR system. The automobile 100 can include a signal processing system 102 that includes an infrared transmitter 104 and a receiver 106. The transmitter 104 can be configured to transmit an infrared pulse 108 having an amplitude 110 (shown in FIG. 2), or a series of such pulses, in the direction of the front 112 of the automobile 100, for example.

Figure 2:
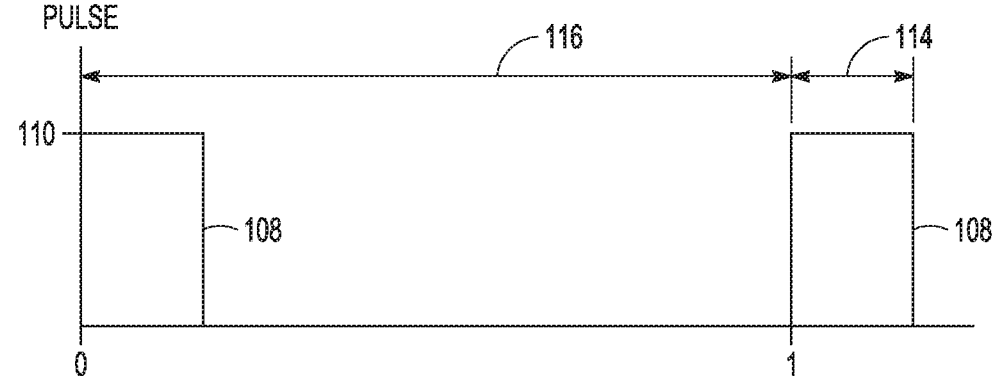
FIG. 2 schematically illustrates infrared pulses transmitted by a laser detection and ranging system.

FIG. 2 schematically illustrates infrared pulses transmitted by a laser detection and ranging system. Each pulse 108 has a pulse width 114, and successive pulses 108 define a period 116, or time between pulses.

Figure 3:
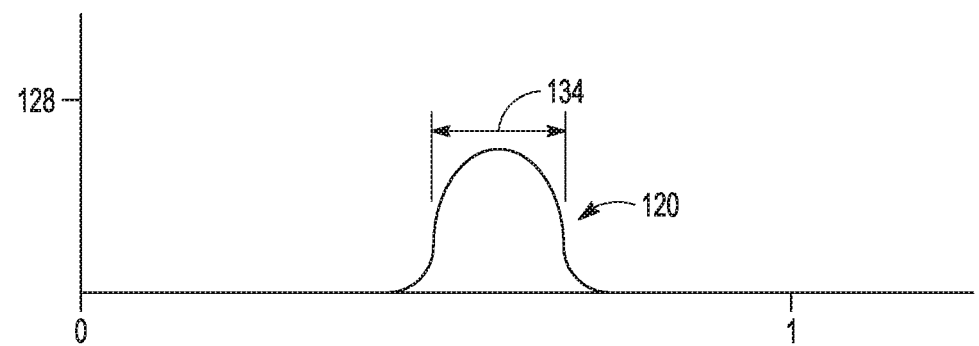
FIGS. 3 and 4 schematically illustrate a reflected infrared pulse received by a laser detection and ranging system.

FIG. 3 schematically illustrates a reflected infrared pulse received by a laser detection and ranging system. If an object 118 is disposed in front of the automobile 100, a transmitted pulse 108 will reflect off of the object 118 to create a reflection pulse 120, such that a portion of the energy in the transmitted pulse 108 returns in the direction of the automobile 100 in a reflection pulse 120 and is received at an infrared receiver 106.

Preferably, the reflection pulse 120 retains the same shape and same total energy as the transmitted pulse 108. In practice, however, a transmitted pulse weakens with the distance (e.g., distance 122 along road 124) of its travel from its source. For example, an electromagnetic signal weakens with the square of its distance from its transmitter. A focused beam of radiation can have different dissipation characteristics. As illustrated in FIG. 3 and described below, the amplitude 128 of the reflected pulse 120 can be less than the amplitude of the transmitted pulse 108.

Depending on the size, shape and material of the object 118, the transmitted pulse 108 can be completely, or nearly completely, reflected from the object 118 back towards the receiver 106 (e.g., from a reflection point 126) in a reflection pulse 120 having an amplitude 128.

Alternately, a point of reflection from the reflecting object 118 can become, in essence, a point source of infrared radiation. In such a case, the reflected pulse 120 also dissipates with the square of the distance traveled from that point source. As such, the energy of a reflection pulse 120 depends on the total distance it travels from its course (transmitter 104) to its reflection point, and then to the receiver 106. This distance can be referred to as its "flight distance" and the time between transmission of the transmitted pulse 108 to the receipt of the reflected pulse 120 can be referred to as the signal's "flight time" (or "time of flight").

Typical automotive object detection systems are configured to detect objects in very close proximity to a vehicle, such as objects as close as a few centimeters from a vehicle, for example. As such, the flight time of an infrared signal is very short. For example, if the total flight distance of an infrared pulse is 2 meters through air (e.g., from a transmitter to an object 1 meter from the transmitter, and from the object to a receiver, at 299,705 km/s), the flight time will be approximately 6.6 nanoseconds. As such, to avoid overlap between signals, the time 116 between a transmitted pulse 108 and a subsequent transmitted pulse 108 is preferably greater than the maximum possible time between transmission of a transmitted pulse 108 and receipt of a corresponding reflection pulse 120 for the range (e.g., 122) of interest. Nevertheless, the time 116 between a transmitted pulse 108 and a subsequent transmitted pulse 108 can be very short e.g., on the order of nanoseconds or tens of nanoseconds. As such, the pulse width 114 of a transmitted pulse 108 must be very short, preferably substantially less than the time 116 between a transmitted pulse 108 and a subsequent transmitted pulse 108.

A reflection pulse 120 typically has less energy than its counterpart transmitted pulse 108, and that energy is spread over a larger span of time that the counterpart transmitted pulse 108, with the result that the reflection pulse 120 can be difficult to detect, and the precise arrival time of the reflection pulse at the receiver 106 can be difficult to determine.

Figure 4:
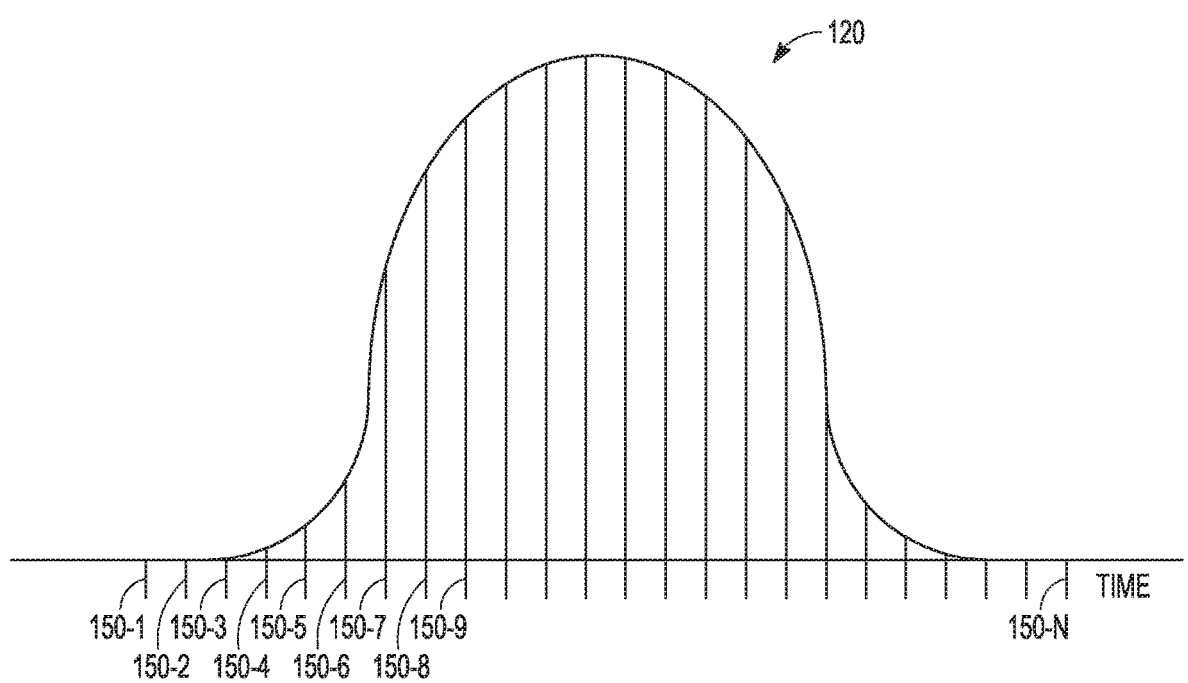

FIG. 4 schematically illustrates a reflected infrared pulse received by a laser detection and ranging system. As seen in FIG. 4, to process a reflection pulse 120, the receiver 106 samples the reflection pulse 120 at many instances between 150-1 and 150-$n$ over a span of time (collectively referred to as "samples 150") in which the reflection pulse 120 can be received at the receiver 106.

As described in detail below, a receiver circuit of a LIDAR system can sample the signal reflected from an object in response to a transmitted light pulse. Using at least some of the received samples 150, a controller can determine a curve fit and, based on a peak value of the curve fit, determine a precise location of the object.

Figure 5:
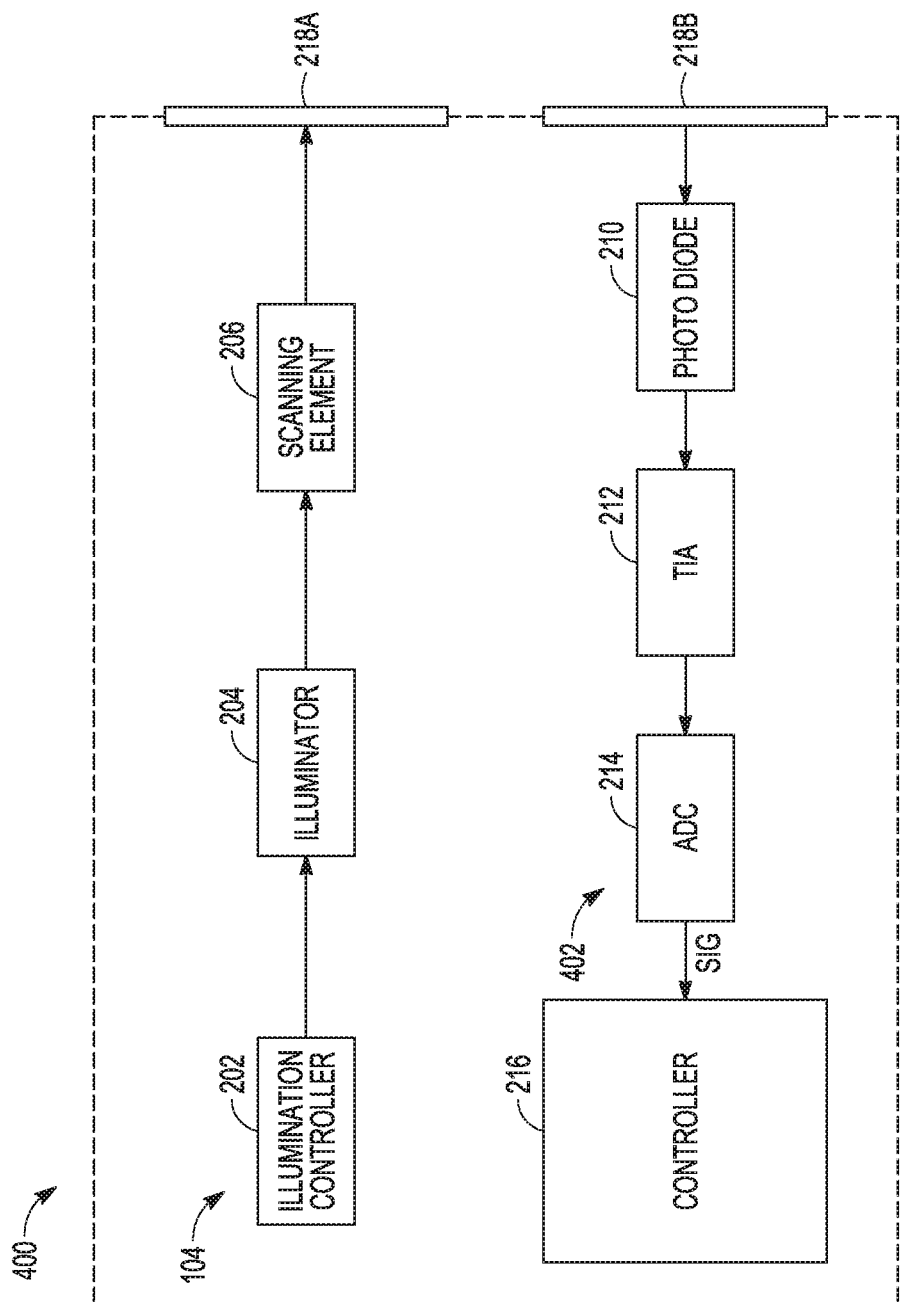
FIG. 5 illustrates an example of a system architecture and corresponding signal flow, such as for implementing a LIDAR system in accordance with various techniques of this disclosure.

In some example configurations, such as shown in FIG. 5, the receiver circuit can include an analog-to-digital converter (ADC) circuit, e.g., a successive approximation register (SAR) ADC. The plurality of light pulses impinging on a photodiode of the receiver circuit can be sampled by the ADC and the ADC circuit can generate representations of those light pulses. A controller coupled to the ADC can determine a curve fit using the output of the ADC and based on a peak value of the curve fit, determine a precise location of the object.

In another example configuration, such as shown and described below with respect to FIGS. 7 and 8, instead of an ADC circuit, the receiver circuit can include a register array coupled to a controller and having a plurality register sets (or pages), where each register set includes a plurality of registers. Each register set can be associated with an output of a corresponding comparator of the receiver circuit. In response to a transmitted laser pulse, the controller can determine the output of each comparator, adjust a register value of a register of a register set based on an output of a corresponding comparator, and after a delay, advance a register pointer for each register and continue determining the output of each comparator and adjusting register values.

Although this disclosure describes processing of a single reflection pulse 120 corresponding to a single transmitted pulse 108, some embodiments operate on multiple pulses and a series of corresponding reflection pulses. Some example implementations operate on sets of one thousand or more consecutive pulses.

FIG. 5 illustrates an example of a system architecture 200 and corresponding signal flow, such as for implementing a LIDAR system in accordance with various techniques of this disclosure. The LIDAR system 200 can be a pulsed illumination LIDAR system.

The LIDAR system 200 can include a transmitter circuit 104 having an illumination controller circuit 202, an illuminator circuit 204, and an optional scanning element 206. The optional scanning element 206 can allow the system to scan through different regions-of-interest, for example.

The receiver circuit 208, which is an example of the receiver circuit 106 of FIG. 1, can include a photodiode 210 coupled to a transimpedance amplifier (TIA) 212. The output of the TIA 212 can be digitized by an analog-to-digital (ADC) circuit 214. In some example configurations, there can be more than one combination of a photodiode 210, TIA 212, and ADC 214 coupled between to a controller 216 (or control circuit).

In the example of FIG. 5, the illumination controller 202 (or control circuit) can be coupled to the illuminator circuit 204 and can control the illumination output of the illuminator circuit 204 to direct infrared pulses of light to a first window 218A and to a detector or detector array of the receiver circuit, such as including the photodiode 210.

During operation, the illumination controller 202 can provide instructions to the illuminator 204 and the optional scanning element 206, such as to cause the illuminator 204 to emit a light beam towards the scanning element 206 and to cause the scanning element 206 to direct the light beam out the first window 218A and towards a target region. In an example, the illuminator 204 can include a laser and the scanning element. The scanning element can adjust an angle of the light beam based on the received instructions from the controller 202. The scanning element can be an electro-optic waveguide, a MEMS mirror, a mechanical mirror, an optical phased array, or any other optical scanning device.

Light scattered or reflected by a target or object in an FOV in response to a light pulse from the illuminator circuit 204 can be received through a second window 218B, such as through a receiver signal. For example, the received light can be detected by the photodiode 210, and a signal representative of the received light can be amplified by the TIA 212 and received by the ADC circuit 214.

The ADC circuit 214 can sample and store sequential samples of the signal representative of the received light, e.g., samples 150 of FIG. 4. For example, the ADC circuit 214 can include a capacitor bank having a plurality of capacitors and the capacitor bank can receive and store charge representative of the samples. The ADC circuit 214 can then digitize the received samples and output the digital signal ("SIG") to the controller 216 (or control circuit) of the receiver circuit 208.

The controller 218 of the receiver circuit 208 can implement various techniques of this disclosure to improve the resolution of the LIDAR system. The controller 218 can receive the digitized samples from the ADC circuit 214, which are representations of the plurality of light pulses impinging on the photodiode, and can determine a curve fit to the received samples. In some non-limiting example implementations, the controller 216 can determine a curve fit to the received samples using spline curve-fitting techniques, e.g., second, third, or even higher order splines.

After determining the curve fit, the controller 216 can determine a derivative of the curve and when the derivative changes from a positive value to a negative value, the peak value of the curve is where the derivative equals zero. Based on the determined peak value of the curve fit, the controller 216 can determine a precise location of the object using the sampling rate and the speed of light, which is about 1 foot per nanosecond.

Figure 6:
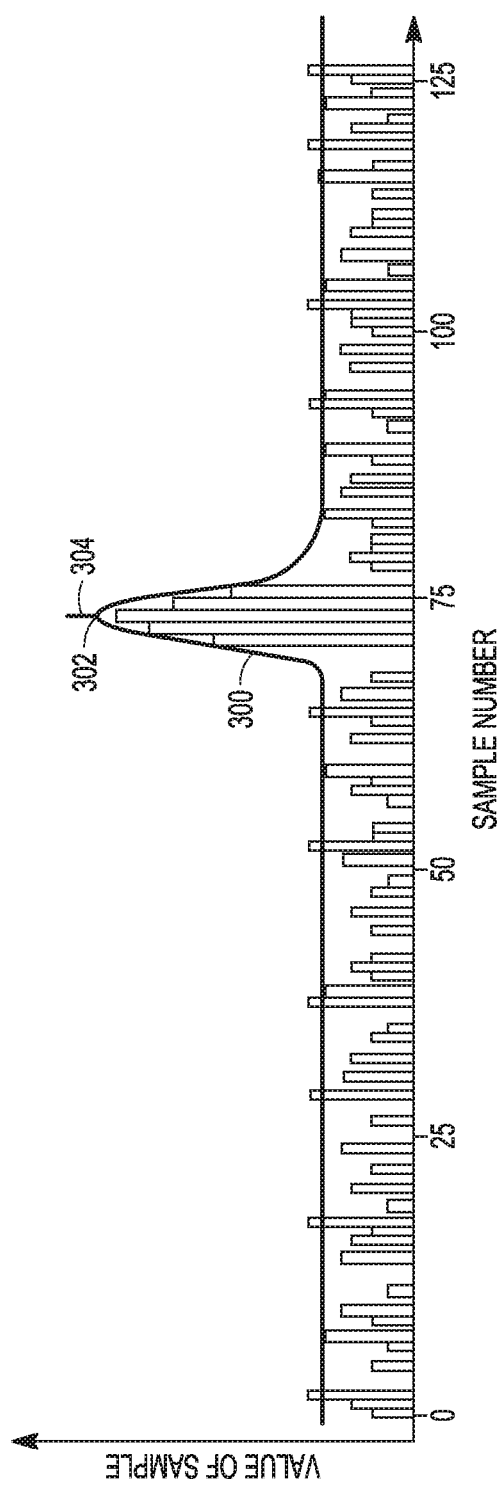
FIG. 6 is a graph of an example of a curve fit to a plurality of received samples.

FIG. 6 is a graph of an example of a curve fit to a plurality of received samples. The x-axis represents the sample number and the y-axis represents the digital value of the received samples as determined by the ADC circuit of FIG. 5. In the example shown in FIG. 6, approximately 125 samples are shown and a reflection pulse 120 appears to be present around sample 75, e.g., between about sample 72 and about sample 76.

Using the techniques described above with respect to FIG. 5, the controller 216 of FIG. 5 can determine a curve fit 300 to the received samples. The controller 216 can then determine a peak value 302 of the curve fit 300, and based on the peak value, the controller 216 can determine a precise location 304 of the object. For example, the controller 216 can determine that the peak value of the curve fit is around 73.8. Using the sampling rate, e.g., 1 gigasample per second (a period of 1 nanosecond), the determined peak value at about 73.8, and the speed of light, the controller 216 can determine the precise location of the object, thereby providing an improvement in the resolution of the LIDAR system.

Figure 7:
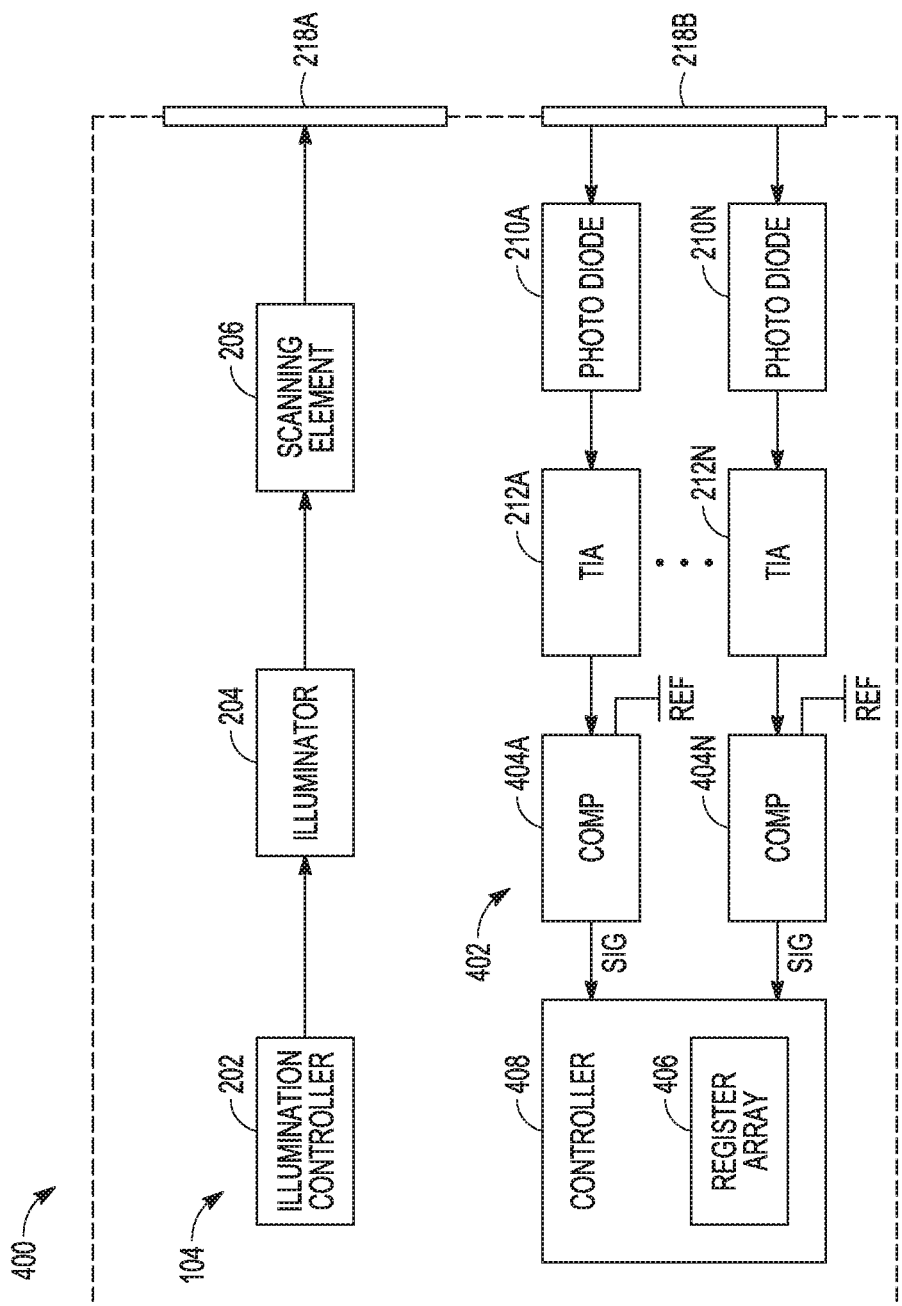
FIG. 7 illustrates another example of a system architecture and corresponding signal flow, such as for implementing a LIDAR system in accordance with various techniques of this disclosure.

FIG. 7 illustrates another example of a system architecture 400 and corresponding signal flow, such as for implementing a LIDAR system in accordance with various techniques of this disclosure. Components in FIG. 7 that are similar to components in FIG. 5 are labeled with similar reference numbers and, for purposes of conciseness, will not be described again.

Unlike the receiver circuit 208 in FIG. 5, the receiver circuit 402 of FIG. 7, which is another example of the receiver circuit 106 of FIG. 1, need not include an ADC circuit. The receiver circuit 402 of FIG. 7 can include a plurality of photodiodes 210A-210N, a plurality of amplifiers 212A-212N, and a plurality of comparators 404A-404N, where each photodiode, e.g., photodiode 210A, is coupled to a corresponding amplifier, e.g., TIA 212A, and a corresponding comparator, e.g., comparator 404A.

Each set of a photodiode, e.g., photodiode 210A, an amplifier, e.g., TIA and a comparator, e.g., comparator 404A, can represent one "pixel". Each pixel can have a corresponding set of registers in a register array 406 integrated within or otherwise coupled to the controller 408 of FIG. 7, such as shown in FIG. 8. Before each measurement cycle, the pointer for each pixel can be set to 0 for its respective pixel.

After each laser pulse, each comparator can compare the output of a corresponding TIA and a reference value ("REF"), generate an output in response, and the controller 408 can receive the output of each comparator. In an example implementation, when the output of a first comparator is a "1", or logic high level, then a value stored in Register 0 of a first register set, e.g., register set 500A of the register array 406 in FIG. 8, corresponding to the comparator 404A can be adjusted, e.g., incremented. When the output of the first comparator is a "0", or logic low level, then the value stored in Register 0 of the register set 500A is not adjusted. Similarly, Register 0 of the register sets 500B-500N corresponding to the comparators 404B-404N can be adjusted (or not adjusted) based on the output of those comparators.

After a delay, e.g., 1 nanosecond, a register pointer can be advanced for each register set, e.g., advance from Register 0 to Register 1, and the process of determining a comparator output and adjusting a value of the register, e.g., incrementing a register value, can be repeated for each register. In some example implementations, the delay can be less than a pulse width of the transmitted laser pulse. This process can be repeated N times until the register pointer reaches the end of the register set.

In some example implementations, a second or more laser pulse(s) can be transmitted after a delay. In such an implementation, the register pointer can be reset and the process of determining a comparator output and adjusting a register value can be repeated. The signal-to-noise ratio (SNR) of the LIDAR system can be improved as more and more reflection pulses are received in response to multiple transmitted laser pulses.

The controller 408 of the receiver circuit 402 can implement various techniques of this disclosure to improve the resolution of the LIDAR system. The stored register values described above are similar to the digitized samples from the ADC circuit 214 described above with respect to FIGS. 5 and 6. In a similar manner, the controller 408 of FIG. 7 can determine a curve fit to the stored register values, e.g., across all register sets, which are representations of the plurality of light pulses impinging on a photodiode of the receiver circuit of FIG. 7. In some non-limiting example implementations, the controller 408 can determine a curve fit to the received samples using spline curve-fitting techniques, e.g., second, third, or even higher order splines.

After determining the curve fit, the controller 408 can determine a derivative of the curve and when the derivative changes from a positive value to a negative value, the peak value of the curve is where the derivative equals zero. Based on the determined peak value of the curve fit, the controller 408 can determine a precise location of the object using the sampling rate and the speed of light, which is about 1 foot per nanosecond. In example implementations that use multiple transmitted laser pulses, the controller 408 can determine the curve fit to the register values that were adjusted using the multiple transmitted laser pulses.

Figure 8:
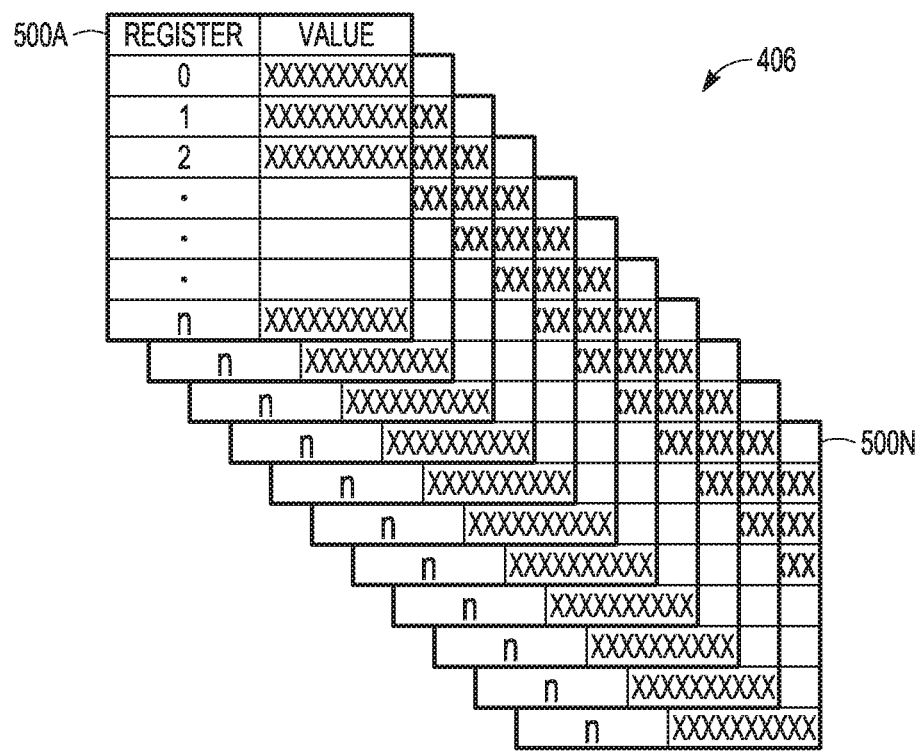
FIG. 8 is a conceptual diagram illustrating a register array including a plurality of sets of registers.

FIG. 8 is a conceptual diagram illustrating a register array including a plurality of sets of registers. The register array 406 can include a number of registers sets 500A-500N, with each register set including a number of registers, e.g., register 0 through register n.

The register array 406 of FIG. 8 can be integrated with or otherwise coupled to the controller 408 of in the receiver circuit of FIG. 7. As described above, each set of a photodiode, an amplifier, and a comparator of FIG. 7 can represent one "pixel" and each pixel can correspond to a register set, e.g., register set 500A, in the register array 406.

As described above, the controller 408 of FIG. 7 can receive the output of each comparator and when the output of a first comparator is a "1", or logic high level, then a value stored in Register 0 of a first register set, e.g., register set 500A of the register array 406 in FIG. 8, corresponding to the comparator 404A can be adjusted, e.g., incremented. When the output of the first comparator is a "0", or logic low level, then the value stored in Register 0 of the first register set is not adjusted. Similarly, Register 0 of the register sets 500B-500N corresponding to the comparators 400B-400N can be adjusted (or not adjusted) based on the output of those comparators.

FIG. 9 is a graph of another example of a curve fit to a plurality of received samples. The x-axis represents the register number and the y-axis represents the register value stored in the registers of FIG. 8 corresponding to the plurality of received samples. In the example shown in FIG. 9, approximately 125 registers are shown and a reflection pulse 120 appears to be present between around register 75, e.g., between about register 72 and about register 76.

Using the techniques described above with respect to FIG. 7, the controller 408 of FIG. 7 can determine a curve fit 600 to the register values. The controller 408 can then determine a peak value 602 of the curve fit, and based on the peak value, the controller 408 can determine a precise location 604 of the object. For example, the controller 408 can determine that the peak value of the curve fit is around 73.8. Using the delay, e.g., 1 nanosecond, between advancements in the register pointer, the determined peak value at about 73.8, and the speed of light, the controller 408 can determine the precise location of the object, thereby providing an improvement in the resolution of the LIDAR system.

As mentioned above, in addition to using curve fitting techniques to improve the resolution of a LIDAR system, this disclosure describes various techniques to adjust a reference value used to determine whether a reflection signal has been received. For example, the reference value REF used by the comparators in FIG. 7 can be adjusted to improve the calculation of the noise floor, which can also improve the resolution of the LIDAR.

FIG. 10 is a graph depicting a calculation of a reference value of a plurality of received samples. The x-axis represents the register number and the y-axis represents the register value stored in the registers of FIG. 8 corresponding to the plurality of received samples. In the example shown in FIG. 10, approximately 125 registers are shown and a reflection pulse 120 appears to be present around register 75, e.g., between about register 72 and about register 76.

To improve the calculation of the noise floor, the controller 408 of FIG. 7 can periodically adjust the reference value used by the comparators in FIG. 7. For example, having already determined from the curve fit which register values are due to a reflection of the transmitted laser pulse from the object, the controller 408 can determine a central tendency, e.g., mean, median, or mode, of the register values, excluding those register values that are due to the reflection. As an example, the controller 408 of FIG. 7 can determine a central tendency 700 of the register values in FIG. 10, excluding the register values between register 72 and register 76.

The controller 408 can adjust the reference value based on the determined central tendency. For example, the controller 408 can set the reference value REF to a value at least equal to a value of a central tendency, e.g., mean, median, or mode, of the register values. As an example, the reference value REF can be set to a mean register value, or a mean register value plus one or more standard deviations of the mean, which can set the ambient floor.

In another example implementation used to periodically adjust the reference value to improve the noise floor, the controller 408 can perform a measurement cycle to determine the output of each comparator before a transmitted laser pulse. The measurement cycle is similar to that describe above with respect to FIG. 7. For example, each comparator can compare the output of a corresponding TIA and a reference value ("REF"), generate an output in response, and the controller 408 can receive the output of each comparator. In an example implementation, when the output of a first comparator is a "1", or logic high level, then a value stored in Register 0 of a first register set, e.g., register set 500A of the register array 406 in FIG. 8, corresponding to the comparator 404A can be adjusted, e.g., incremented. When the output of the first comparator is a "0", or logic low level, then the value stored in Register 0 of the register set 500A is not adjusted. Similarly, Register 0 of the register sets corresponding to the comparators 404B-404N can be adjusted (or not adjusted) based on the output of those comparators.

After a delay, e.g., 1 nanosecond, a register pointer can be advanced for each register set, e.g., advance from Register 0 to Register 1, and the process of determining a comparator output and adjusting a value of the register, e.g., incrementing a register value, can be repeated for each register. This process can be repeated. N times until the register pointer reaches the end of the register set.

Then, the controller 408 can determine a central tendency and can adjust the reference value based on the determined central tendency. For example, the controller 408 can set the reference value REF to a value at least equal to a value of a central tendency, e.g., mean, median, or mode, of the register values. As an example, the reference value REF can be set to a mean register value, or a mean register value plus one or more standard deviations of the mean, which can set the ambient floor.

Notes

Each of the non-limiting aspects or examples described herein can stand on its own or can be combined in various permutations or combinations with one or more of the other examples.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." in this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code can form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact discs and digital video discs), magnetic cassettes, memory cards or sticks, random access memories (RAMs), read only memories (ROMs), and the like.

The above description is intended to be illustrative, and not restrictive. For example, the above-described examples (or one or more aspects thereof) can be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features can be grouped together to streamline the disclosure. This should not be interpreted as intending that an unclaimed disclosed feature is essential to any claim. Rather, inventive subject matter can lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The claimed invention is:

1. A LIDAR system for determining a location of an object by sampling a plurality of light pulses impinging on a receiver circuit having a plurality of photodiodes, a plurality of amplifiers, and a plurality of comparators, and wherein each photodiode is coupled to a corresponding amplifier and a corresponding comparator, the system comprising:
    a controller coupled to an output of the amplifier;
    a register array coupled to the controller and having a plurality register sets, wherein each register set includes a plurality of registers, wherein each register set is associated with an output of a corresponding comparator of the receiver circuit,
    wherein the control circuit is configured to, in response to a transmitted laser pulse:
        determine the output of each comparator;
        adjust a register value of a register based on the determined output of a corresponding comparator;
        after a delay, advance a register pointer for each register set and repeat the determining and adjusting;
        determine a curve fit to the register values; and
        determine the location of the object based on a peak value of the curve fit.

2. The LIDAR system of claim 1, wherein the transmitted laser pulse is a first transmitted laser pulse, and wherein after a second transmitted laser pulse, the controller is further configured to:
    reset the register pointer for each register set and repeat the determining and adjusting; and
    determine the curve fit to the register values.

3. The LIDAR system of claim 1, wherein the controller configured to adjust the register value of the register based on the determined output of a corresponding comparator is configured to:
    increment the register value when the comparator output is 1.

4. The LIDAR system of claim 1, wherein each comparator is configured to compare a reference value to a representation of an output of a corresponding photodiode, wherein the controller is configured to:
    periodically adjust the reference value.

5. The LIDAR system of claim 4, wherein the controller configured to periodically adjust the reference value is configured to:
    before the transmitted laser pulse, determine the output of each comparator;

adjust the register value of the register based on the determined output of a corresponding comparator; and
set the reference value to a value at least equal to a value of a central tendency of the register values.

6. The LIDAR system of claim 4, wherein the controller configured to periodically determine the reference value is configured to:
determine a central tendency of the register values, excluding register values that are due to a reflection of the transmitted laser pulse from the object, wherein the reference value is set based on the determined central tendency.

7. The LIDAR system of claim 1, wherein the delay is less than a pulse width of the transmitted laser pulse.

8. A method of determining a location of an object by sampling a plurality of light pulses impinging on a receiver circuit of a LIDAR system, the method comprising:
in response to a transmitted laser pulse:
determining an output of a plurality of comparators in the receiver circuit;
in a register array having a plurality of register sets, wherein each register set includes a plurality of registers, adjusting a register value of a register based on the determined output of a comparator corresponding to the register set;
after a delay, advancing a register pointer for each register set and repeating the determining and adjusting;
determining a curve fit to the register values; and
determining the location of the object based on a peak value of the curve fit.

9. The method of claim 8, wherein the transmitted laser pulse is a first transmitted laser pulse, the method further comprising:
after a second transmitted laser pulse:
resetting the register pointer for each register set and repeating the determining and adjusting; and
determining the curve fit to the register values.

10. The method of claim 8, wherein adjusting the register value of the register based on the determined output of the corresponding comparator includes:
incrementing the register value when the comparator output is 1.

11. The method of claim 8, wherein each comparator is configured to compare a reference value to a representation of an output of a corresponding photodiode, the method comprising:
periodically adjusting the reference value.

12. The method of claim 11, wherein periodically adjusting the reference value includes:
before the transmitted laser pulse, determining the output of each comparator;
adjusting the register value of the register based on the determined output of a corresponding comparator; and
setting the reference value to a value at least equal to a value of a central tendency of the register values.

13. The method of claim 11, wherein periodically adjusting the reference value includes:
determining a central tendency of the register values, excluding register values that are due to a reflection of the transmitted laser pulse from the object, wherein the reference value is set based on the determined central tendency.

14. The method of claim 8, wherein the delay is less than a pulse width of the transmitted laser pulse.

15. A LIDAR system for determining a location of an object by sampling a plurality of light pulses, the system comprising:
means for generating representations of the plurality of light pulses;
a register array having a plurality register sets, wherein each register set includes a plurality of registers, wherein each register set is associated with an output of a corresponding comparator of a receiver circuit;
in response to a transmitted laser pulse:
means for adjusting a register value of a register based on the determined output of a comparator corresponding to the register set;
means for determining a curve fit to the register values; and
means for determining the location of the object based on a peak value of the curve fit.

16. The LIDAR system of claim 15, wherein the transmitted laser pulse is a first transmitted laser pulse, and wherein in response to a second transmitted laser pulse:
means for resetting a register pointer for each register set and repeating the determining and adjusting.

17. The LIDAR system of claim 15, wherein the means for adjusting the register value of a register based on the determined output of a comparator corresponding to the register set includes:
means for incrementing the register value when the comparator output is 1.

18. The LIDAR system of claim 15, wherein each comparator is configured to compare a reference value to a representation of an output of a corresponding photodiode, the system comprising:
means for periodically adjusting the reference value.

19. The LIDAR system of claim 18, wherein the means for periodically adjusting the reference value includes:
means for determining the output of each comparator before the transmitted laser pulse;
means for adjusting the register value of the register based on the determined output of a corresponding comparator; and
means for setting the reference value to a value at least equal to a value of a central tendency of the register values.

20. The LIDAR system of claim 18, wherein the means for periodically adjusting the reference value includes:
means for determining a central tendency of the register values, excluding register values that are due to a reflection of the transmitted laser pulse from the object, wherein the reference value is set based on the determined central tendency.

\* \* \* \* \*